United States Patent

Kataoka et al.

(10) Patent No.: US 6,635,977 B2
(45) Date of Patent: Oct. 21, 2003

(54) CONTROL APPARATUS FOR VIBRATION WAVE ACTUATOR

(75) Inventors: Kenichi Kataoka, Kanagawa (JP); Akio Atsuta, Kanagawa (JP); Shinji Yamamoto, Kanagawa (JP); Tadashi Hayashi, Kanagawa (JP); Jun Ito, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 32 days.

(21) Appl. No.: 10/022,520

(22) Filed: Dec. 20, 2001

(65) Prior Publication Data

US 2002/0121869 A1 Sep. 5, 2002

(30) Foreign Application Priority Data

Dec. 28, 2000 (JP) ........................................ 2000-403223

(51) Int. Cl.⁷ .............................. H02N 2/00; H01L 41/02
(52) U.S. Cl. ................. 310/316; 310/316.01; 310/317; 310/611; 310/323; 310/128; 310/116
(58) Field of Search ............................ 310/316, 316.01, 310/323, 317

(56) References Cited

U.S. PATENT DOCUMENTS

| | | | |
|---|---|---|---|
| 5,001,404 A | 3/1991 | Kataoka | 318/116 |
| 5,004,964 A | 4/1991 | Kataoka et al. | 318/128 |
| 5,134,333 A | 7/1992 | Atsuta | 310/323 |
| 5,157,300 A | 10/1992 | Kataoka et al. | 310/323 |
| 5,165,047 A | 11/1992 | Shimizu | 318/116 |
| 5,231,325 A | 7/1993 | Tamai et al. | 310/323 |
| 5,247,221 A | 9/1993 | Atsuta | 310/323 |
| 5,285,134 A | 2/1994 | Kataoka | 318/116 |
| 5,298,829 A | 3/1994 | Tsukimoto et al. | 310/323 |
| 5,300,850 A | 4/1994 | Okumura et al. | 310/323 |
| 5,436,521 A | 7/1995 | Kataoka | 310/317 |
| 5,459,370 A | 10/1995 | Kataoka | 310/317 |
| 5,484,216 A | 1/1996 | Kimura et al. | 400/319 |
| 5,539,268 A | 7/1996 | Kataoka | 310/316 |
| 5,612,598 A | 3/1997 | Fukui et al. | 318/116 |
| 5,631,516 A | 5/1997 | Kataoka | 510/316 |
| 5,656,881 A | 8/1997 | Atsuta | 310/316 |
| 5,739,621 A | 4/1998 | Atsuta et al. | 310/316 |
| 5,889,350 A | 3/1999 | Yamamoto | 310/316 |
| 5,920,144 A | 7/1999 | Atsuta | 310/316 |
| 5,939,851 A | 8/1999 | Kataoka et al. | 318/611 |
| 5,986,385 A | 11/1999 | Atsuta | 310/323 |
| 6,031,316 A | 2/2000 | Kataoka | 310/316 |
| 6,037,701 A | 3/2000 | Atsuta | 310/316.01 |
| 6,049,156 A | 4/2000 | Yamamoto et al. | 310/316.01 |
| 6,054,795 A | 4/2000 | Yamamoto et al. | 310/316.01 |
| 6,072,267 A | 6/2000 | Atsuta | 310/323.06 |
| 6,084,334 A | 7/2000 | Yamamoto et al. | 310/316.01 |
| 6,100,622 A | 8/2000 | Yamamoto et al. | 310/316.01 |
| 6,107,720 A | 8/2000 | Atsuta | 310/316.01 |
| 6,121,714 A | 9/2000 | Atsuta | 310/316.01 |
| 6,133,671 A | 10/2000 | Atsuta et al. | 310/316.01 |
| 6,177,753 B1 | 1/2001 | Atsuta | 310/316.01 |
| 6,313,564 B1 | 11/2001 | Kataoka et al. | 310/316.01 |

FOREIGN PATENT DOCUMENTS

| | | |
|---|---|---|
| JP | 1-303074 | 12/1989 |
| JP | 3-22870 | 1/1991 |

*Primary Examiner*—Nestor Ramirez
*Assistant Examiner*—Iraj A. Mohandesi
(74) *Attorney, Agent, or Firm*—Fitzpatrick, Cella, Harper & Scinto

(57) ABSTRACT

This invention relates to an arrangement for detecting the driven state of a vibration wave actuator apparatus and provides an apparatus in which a waveform signal having an amplitude corresponding to a vibration state is generated by a monitor circuit, and this waveform signal is level-detected by a comparing circuit having a predetermined threshold so as to form a signal having a pulse width corresponding to the amplitude of the waveform signal, thereby detecting a vibration state from the pulse width.

13 Claims, 14 Drawing Sheets

CONTROL APPARATUS FOR VIBRATION WAVE ACTUATOR

BACKGROUND OF THE INVENTION

1. Field of the Invention

The present invention relates to a control apparatus for a vibration wave actuator.

2. Related Background Art

In general, a vibration wave (or type) actuator includes a vibration member in which drive vibrations are produced and a contact member pressed against the vibration member, and is designed to move the vibration member and contact member relative to each other by using the drive vibrations.

The vibration member is generally comprised of an elastic member and piezoelectric elements serving as electromechanical energy conversion elements. For example, piezoelectric elements having driving phases at positions with a spatial phase difference of 90° are arranged on the elastic member, and two-phase alternating signals having a phase difference of 90° are applied to the two driving phases, thereby producing travelling waves on the elastic member. The contact member is then pressed against the elastic member to obtain a driving force by a frictional force.

Note that a friction material for obtaining a proper frictional force is bonded, applied, or formed on the contact portion between the vibration member and the contact member.

According to a conventional method of detecting the vibration amplitude of the vibration wave actuator, an electrode for vibration detection is provided for a piezoelectric element, and the value obtained by converting mechanical energy accompanying vibrations into electrical energy is used as vibration detection information. For example, vibration detection information is compared with a threshold voltage by a comparator to detect whether the voltage represented by the information is higher or lower than the threshold voltage, as disclosed in Japanese Patent Application Laid-Open No. 1-303074, or the information is rectified and converted into a DC voltage, and the voltage is A/D-converted to be detected, as disclosed in Japanese Patent Application Laid-Open No. 3-22870.

In the method of detecting vibration amplitude disclosed in Japanese Patent Application Laid-Open No. 1-303074, since the result obtained by comparator only makes it possible to determine whether the information is higher or lower than a predetermined level, in order to accurately know vibration amplitude, for example, a plurality of thresholds must be prepared to detect amplitude. This requires many comparators.

In the method of detecting vibration amplitude disclosed in Japanese Patent Application Laid-Open No. 3-22870, a driving waveform signal is rectified and smoothed first, and then the resultant signal is read into a computer through an A/D converter. This requires a complicated, expensive circuit. In addition, since the signal is smoothed, detection generates a delay.

SUMMARY OF THE INVENTION

According to one aspect of the invention, there is provided a control apparatus for a vibration wave actuator which excites a vibration member and obtains a driving force by applying a frequency signal to a driving electromechanical energy conversion element mounted on the vibration member, comprising a driven state detecting unit including a monitor unit which outputs a waveform signal having an amplitude corresponding to the vibration state of the vibration member, a pulse width forming circuit which forms a pulse width signal by comparing a signal from the monitor unit with a threshold, and a determining circuit which determines the driven state in accordance with the pulse width, wherein a driven state (e.g., the amplitude of a waveform signal corresponding to the vibration state) is detected based on the pulse width.

The above and other objects, features, and advantages of the present invention will be apparent from the following detailed description in conjunction with the accompanying drawings and the appended claims.

DETAILED DESCRIPTION OF THE PREFERRED EMBODIMENTS

First Embodiment

Figure 9:
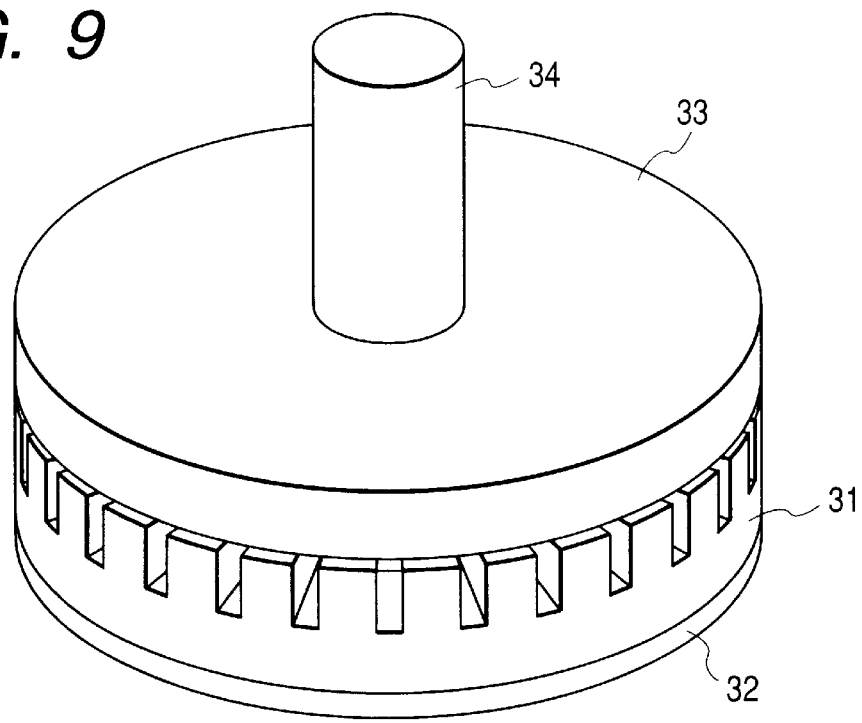
FIG. 9 is a perspective view showing the outer appearance of a vibration wave actuator.

An example of a vibration wave actuator will be briefly described below prior to a description of an embodiment. FIG. 9 is a perspective view showing an example of a ring-like vibration wave motor serving as a vibration wave actuator. A ring-like elastic member 31 is made of an elastic material. A piezoelectric element 32 serves as an electromechanical energy conversion element bonded to one surface of the elastic member 31. The elastic member 31 and piezoelectric element 32 comprise a vibration member. A rotor 33 serves as a contact member pressed against the elastic member 31 by a pressurizing means (not shown). A rotating shaft 34 is integrated with the rotor 33.

Figure 10:
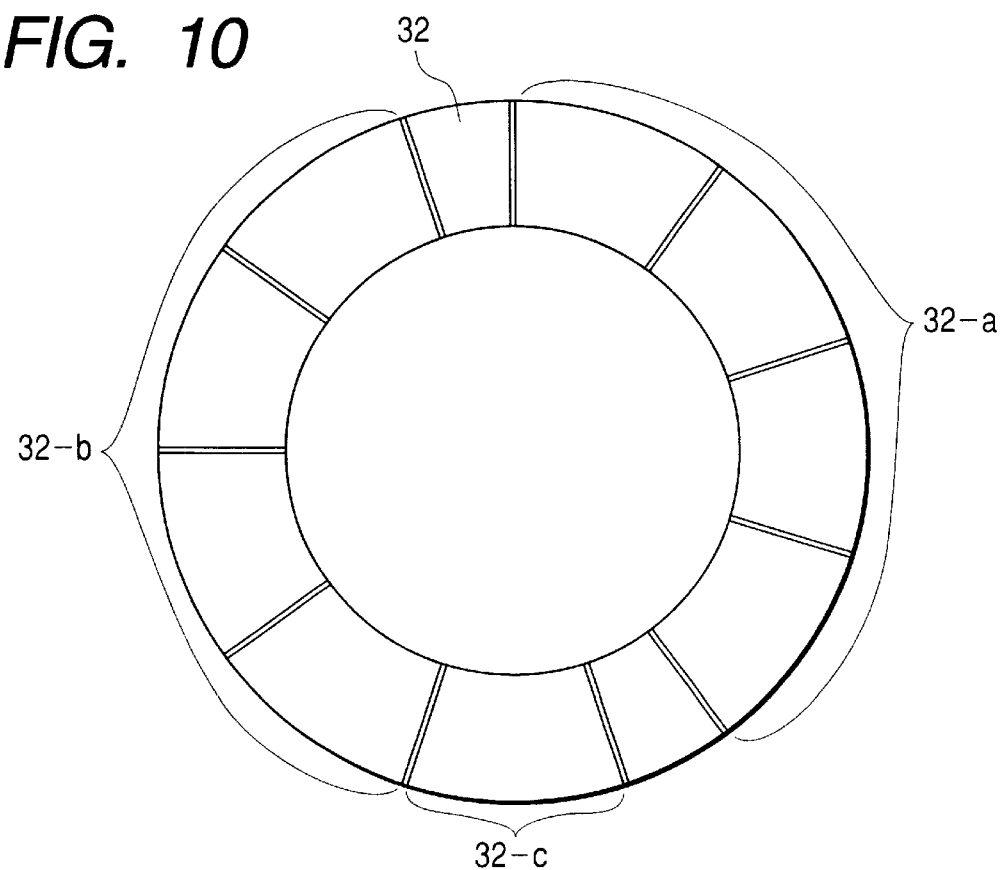
FIG. 10 is a view showing the electrode structure of a vibration member.

FIG. 10 shows the shape of the piezoelectric element 32. The piezoelectric element 32 generally has a thickness of 1 mm or less and a ring-like shape in this case. The elastic member 31 is bonded to one surface of the piezoelectric element 32, whereas the electrode on the other surface is divided into a plurality of electrode sections, as shown in FIG. 10. In this case, two-phase driving electrode sections 32-a and 32-b and a vibration detection electrode 32-c are formed. Letting λ be the wavelength of driving vibrations, travelling waves with, for example, a wave number of 7λ or 8λ are produced in the elastic member 31.

In the two driving electrode sections 32-a and 32-b, for example, electrode portions with different polarization directions in the thickness direction are alternately arranged at λ/2 intervals. The two driving electrode sections 32-a and 32-b are arranged at a distance of λ/4 from each other. The vibration detection electrode 32-c is an electrode section for vibration detection which has a length of λ/2.

In general, two-phase driving voltages having a phase difference of nearly 90° are applied to the driving electrode sections 32-a and 32-b to cause them to excite standing waves in the elastic member 31. By synthesizing these two standing waves, a travelling vibration wave is produced on the elastic member 31, thereby rotating the rotor 33 and rotating shaft 34. The vibrations actually produced in the vibration member are detected by the vibration detection electrode 32-c.

A piezoelectric element corresponding to the driving electrode section 32-a will be referred to as the A-phase PZT hereinafter; a piezoelectric element corresponding to the driving electrode section 32-b, the B-phase PZT; and a piezoelectric element corresponding to the vibration detection electrode 32-c, the S-phase PZT.

The embodiment will be described below.

Figure 1:
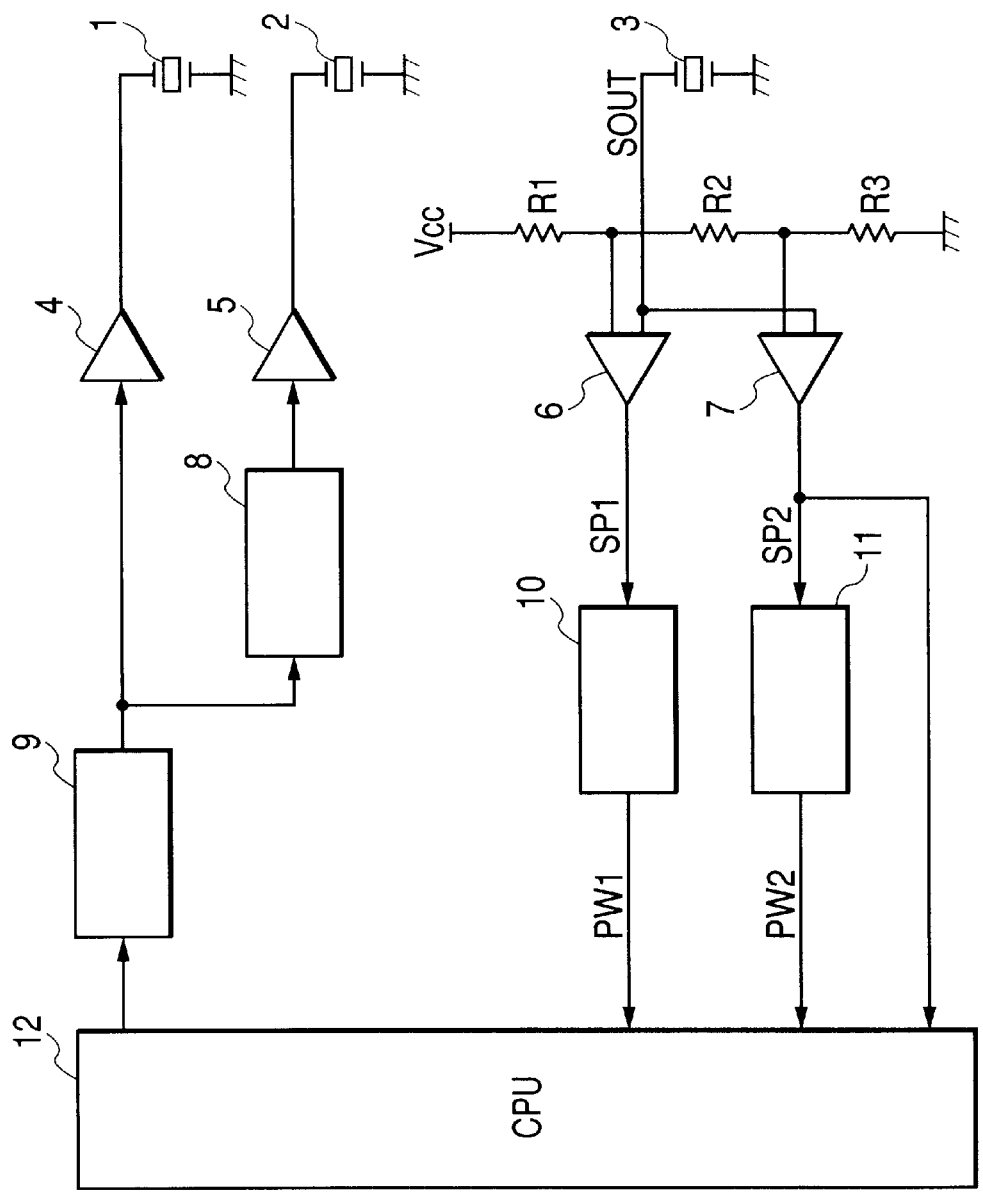
FIG. 1 is a block diagram showing the first embodiment.

FIG. 1 is a block diagram showing the first embodiment of the present invention. This embodiment includes an A-phase PZT 1, B-phase PZT 2, and S-phase PZT 3 of a vibration wave actuator. These members correspond to the respective sections of a piezoelectric element bonded to one vibration wave actuator.

Each of amplifying circuits 4 and 5 amplifies a voltage to be applied to the vibration wave actuator up to a voltage that generates a force large enough to produce vibrations. These circuits may be simple boosting circuits using transformers and coils.

A CPU 12 determines the frequency and amplitude of an AC voltage to be applied to the vibration wave actuator to set the vibration amplitude of the vibration wave actuator to a predetermined value. A driving voltage generator 9 generates an AC voltage in accordance with a frequency command and voltage command from the CPU 12. A phase shifting circuit 8 is designed to shift the phase of the AC voltage output from the driving voltage generator 9 by 90°. The CPU 12 detects vibration amplitude to control the vibration amplitude of the vibration wave actuator. The arrangement and operation of a detecting circuit will be described below.

An output signal SOUT from the S-phase PZT 3 has a waveform corresponding to the actual vibrations of the vibration wave actuator. Each of comparators 6 and 7 compares the signal SOUT with a predetermined value. If the signal SOUT is larger than the predetermined value, each comparator outputs a high-level signal; otherwise it outputs a low-level signal.

Figure 3:
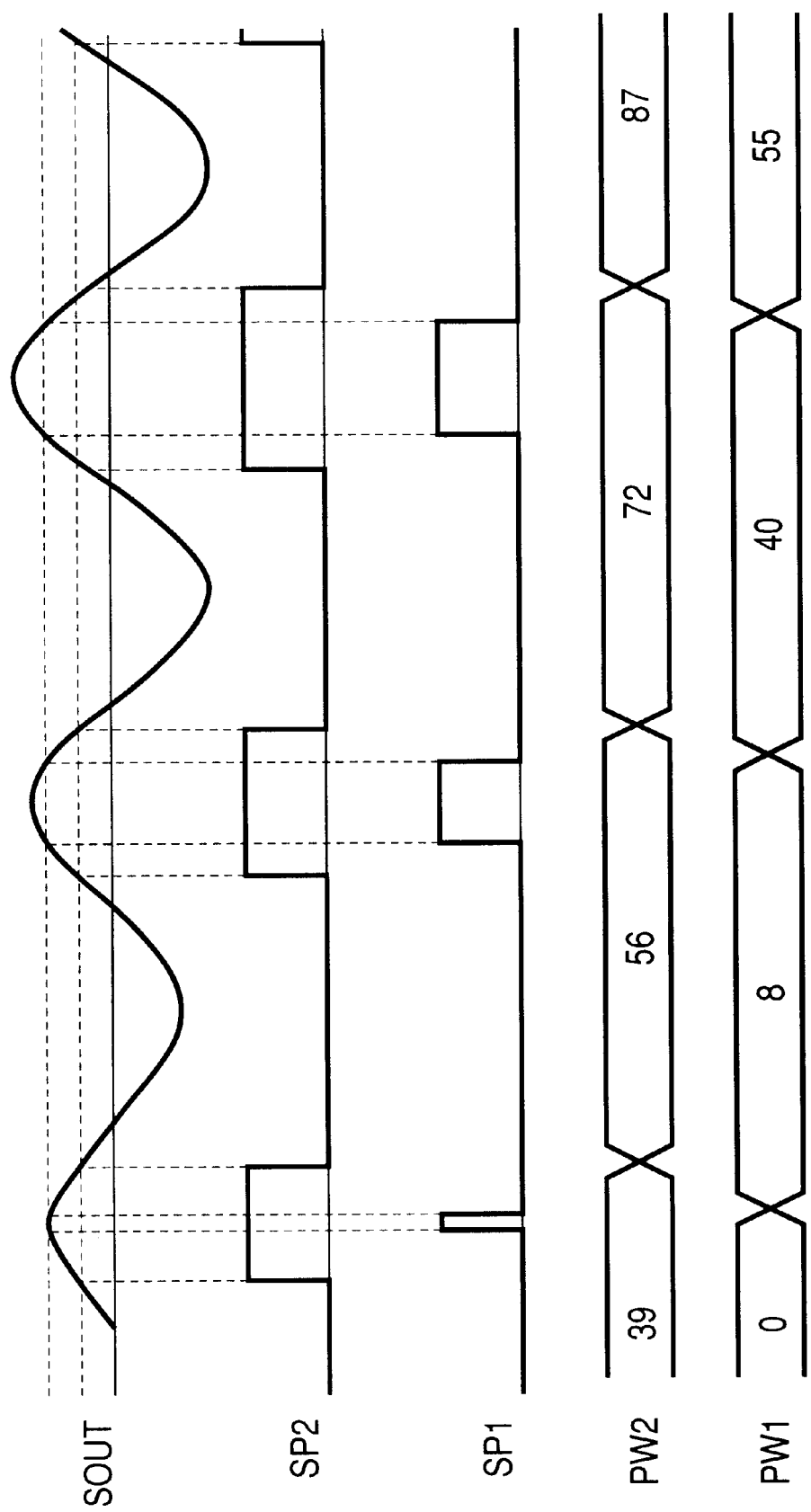
FIG. 3 is a timing chart for explaining the operation of the first embodiment.

The comparison voltages of the comparators 6 and 7 are determined by resistance voltage division. As shown in FIG. 1, the comparison voltage of the comparator 6 is given by Vcc×(R2+R3)/(R1+R2+R3), and the comparison voltage of the comparator 7 is given by Vcc×R3/(R1+R2+R3). In this case, as shown in FIG. 3, the signal SOUT is a sine wave centered on almost 0 (output voltage is almost 0). If, therefore, a control voltage Vcc is a positive voltage, the pulse width of an output signal SP2 from the comparator 7 is larger than that of an output signal SP1 from the comparator 6. As shown in FIG. 3, as the amplitude of the signal SOUT increases, the pulse widths of the output signals SP1 and SP2 from the comparators 6 and 7 increase. In addition, the pulse width of the output signal SP2 is larger than that of the output signal SP1.

Referring to FIG. 1, pulse width detecting circuits 10 and 11 count the pulse widths of the output signals SP1 and SP2 by using predetermined count clocks (which generally have a frequency of 1 MHz or more; the operation clock of the CPU 12 may be used). Referring to the timing chart of FIG. 3, the pulse width detecting circuits 10 and 11 respectively detect pulse widths PW1 and PW2 on the basis of the output signals SP1 and SP2 from the comparators 6 and 7, and output them to the CPU 12.

The CPU 12 obtains the amplitude of the signal SOUT on the basis of the outputs PW1 and PW2 from the pulse width detecting circuits 10 and 11.

Figure 12:
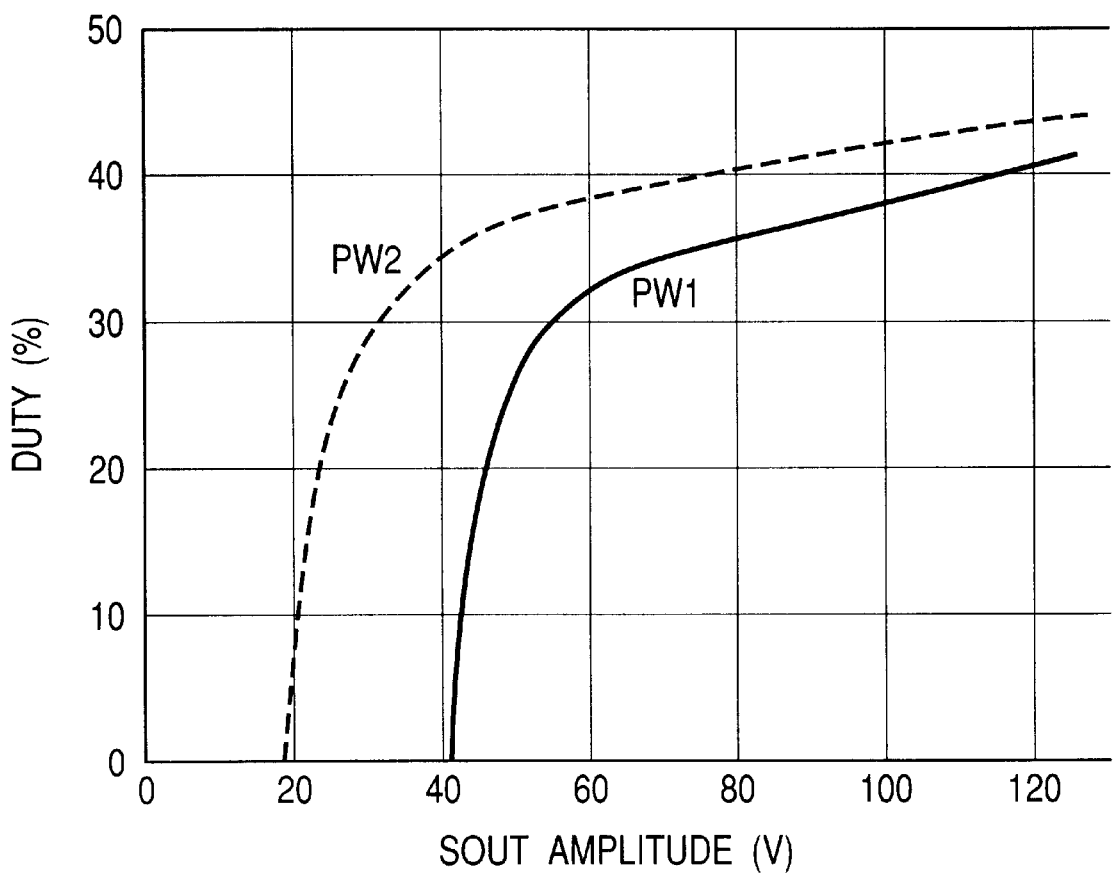
FIG. 12 is a graph showing the relationship between the amplitude of an output signal from an S-phase PZT and the pulse width of a pulse signal.

FIG. 12 is a graph showing the relationship between SOUT and changes in pulse width. The solid line represents changes in PW1, and the dashed line represents changes in PW2. As is obvious from FIG. 12, as SOUT increases, the degree of change decreases. Therefore, the resolution of detection of the amplitude of SOUT can be increased by using PW1 when SOUT is large, and PW2 when SOUT is small.

While PW1 is 0, the vibration amplitude of SOUT may be obtained by PW2. When PW1 is not 0, the vibration amplitude of SOUT may be obtained by PW1. Alternatively, the average of vibration amplitudes based on PW1 and PW2 may be obtained, or coefficients for PW1 and PW2 may be changed in accordance with a table.

FIG. 12 shows the peak value of SOUT. However, effective values or average values can be easily obtained by measuring the correspondence between them and pulse widths in advance.

Figure 13:
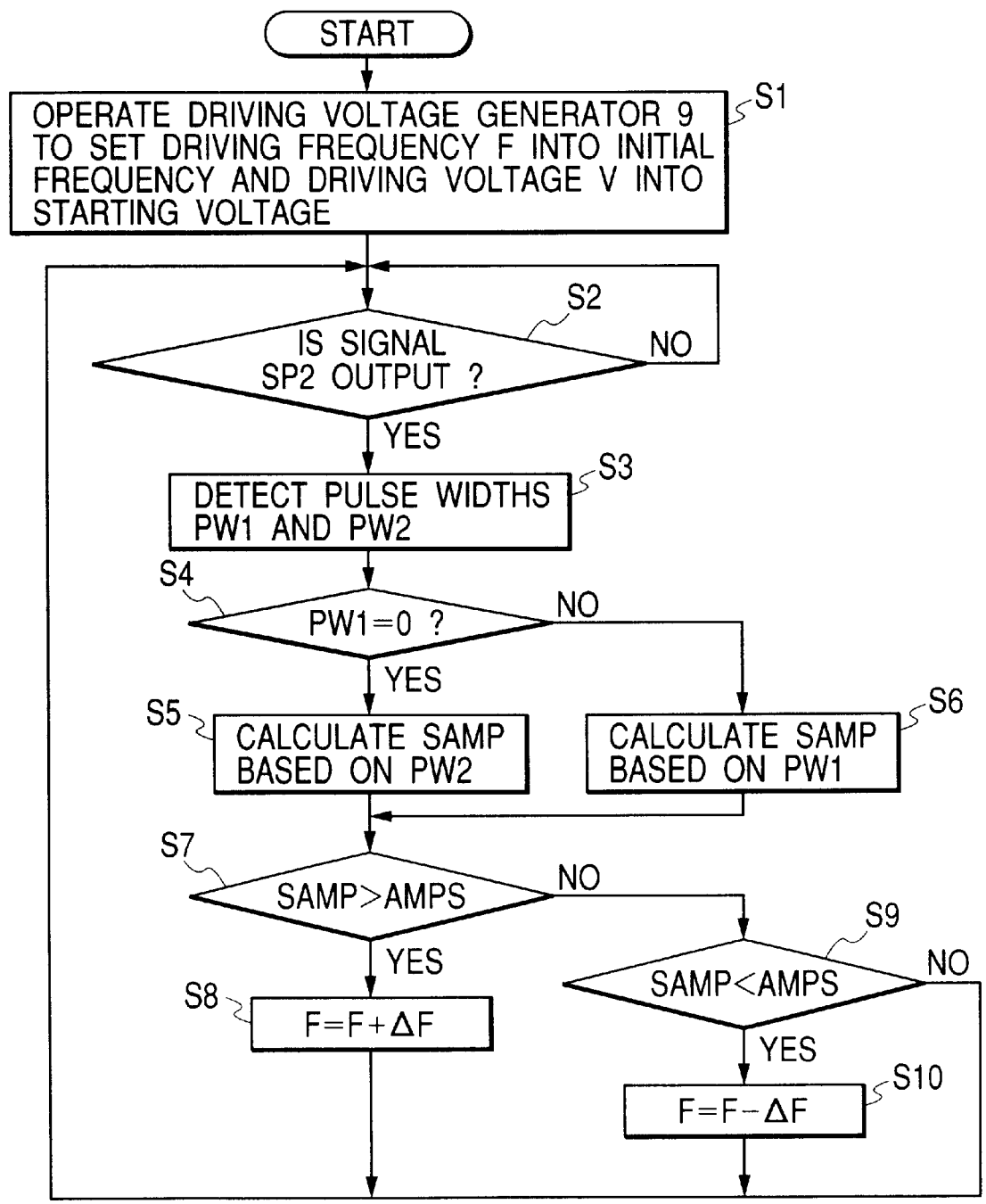
FIG. 13 is a flow chart for explaining the operation of a CPU in the first embodiment.

The operation of the CPU 12 for controlling the vibration amplitude of SOUT will be described below with reference to the flow chart of FIG. 13.

First of all, in the driving voltage generator 9, a driving frequency F is set to an initial frequency and a driving voltage V is set to a desired starting voltage (S1). As a consequence, the vibration wave actuator starts rotating, and a small voltage amplitude waveform appears in SOUT.

The comparators 6 and 7 then compare SOUT with predetermined thresholds. The pulse widths PW1 and PW2 respectively detected by the pulse width detecting circuits 10 and 11 are input to the CPU 12.

The CPU 12 detects the pulse widths PW1 and PW2 (S3) after the output timing of the output signal SP2 from the comparator 7 has elapsed (S2).

The CPU 12 checks whether the pulse width PW1 is 0 (S4). If the pulse width PW1 is 0, the CPU 12 calculates an amplitude SAMP of SOUT from the pulse width PW2 (S5). The CPU 12 uses a calculation method obtained from a table determined with respect to the value of the pulse width PW2. If the pulse width PW1 is not 0, the amplitude of SOUT is calculated from the table on the basis of the pulse width PW1 (S6).

The calculated amplitude SAMP of SOUT is compared with a target amplitude AMPSM (S7). If the amplitude SAMP of SOUT is smaller than the amplitude AMPSM, the driving frequency F is decreased by ΔF (S9, S10). If the amplitude of SOUT is larger than the amplitude AMPSM, the driving frequency F is increased by ΔF (S8). Assume that the amplitude of SOUT is smaller than the amplitude AMPSM. In this case, since the driving frequency F approaches the resonance frequency of the vibration wave actuator by ΔF, the vibration amplitude of the vibration wave actuator increases, resulting in an increase in the amplitude of SOUT. In this manner, the amplitude of SOUT approaches the target amplitude.

In this embodiment, the amplitude of SOUT is detected by using the two comparators. Vibration amplitude can be obtained with higher precision by using more comparators.

Figure 5:
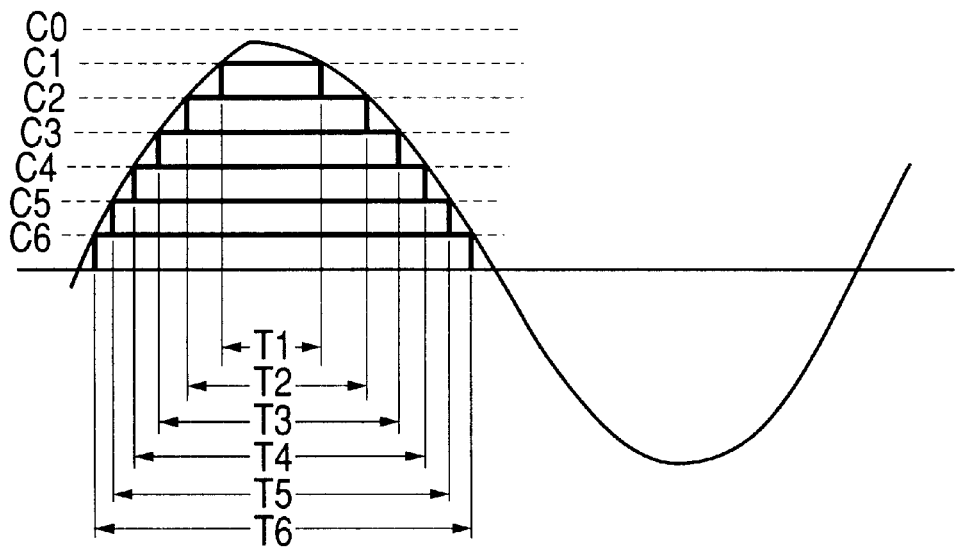
FIG. 5 is a graph for explaining how to obtain an average value.

In the case shown in FIG. 5, comparison values C0 to C6 are set for comparators. The comparison values for the comparators may or may not be set in equal steps. FIG. 5 shows substantially a sine waveform and a pulse waveform obtained as a result of a comparison between the sine waveform and the comparison values C0 to C6.

Since the sine waveform is smaller than C0, no pulse waveform is output. With the comparison values C1 to C6, however, waveforms respectively having pulse widths T1 to T6 are output.

Referring to FIG. 5, the area of a pyramidal shape indicated by a pulse waveform can be easily obtained from the sum of the products of the pulse widths and the threshold steps. An approximate average value of the sine waveform can be obtained by dividing this area by the period of the sine waveform.

In addition, since the driving frequency of the vibration wave actuator is near the resonance frequency of the vibration member and requires no large change, no serious problem arises even if division by the period of the sine waveform is omitted. Furthermore, if equal threshold steps are set, an average value can be obtained by only obtaining the sum of pulse widths.

Figure 6:
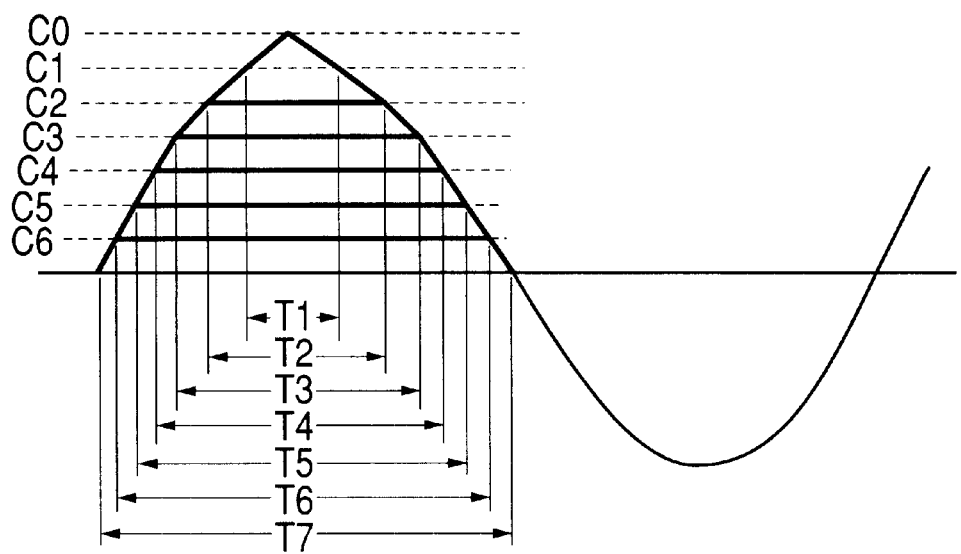
FIG. 6 is a graph for explaining how to obtain an average value.

A correction calculation for the acquisition of the accurate area of a sine waveform will be further described below. FIG. 6 explains this operation. In contrast to the stepped shape in FIG. 5, the shape in FIG. 6 is a stack of trapezoids and has a rectangular top. This makes it possible to obtain an accurate average value. In this case, the triangular top may be omitted.

Assuming that the threshold steps are equal to each other and set to 1, an area S based on a trapezoidal calculation is expressed by $$S = \frac{T1}{2} + \frac{T1+T2}{2} + \frac{T2+T3}{2} + \qquad(1)$$
$$\frac{T3+T4}{2} + \frac{T4+T5}{2} + \frac{T5+T6}{2} + \frac{T6+T7}{2}$$
$$= T1 + T2 + T3 + T4 + T5 + T6 + \frac{T7}{2}$$

The area S without the rectangular top is expressed by $$S = \qquad(2)$$
$$\frac{T1+T2}{2} + \frac{T2+T3}{2} + \frac{T3+T4}{2} + \frac{T4+T5}{2} + \frac{T5+T6}{2} + \frac{T6+T7}{2}$$
$$= \frac{T1}{2} + T2 + T3 + T4 + T5 + T6 + \frac{T7}{2}$$

It therefore suffices if a correction term of T7/2 or (T7−T1)/2 is added to the sum of pulse widths (the sum of T1 to T6). Since T7 corresponds to a half period of a sine wave, if the driving frequency is determined, the above calculation can be done without measurement.

Figure 7B:
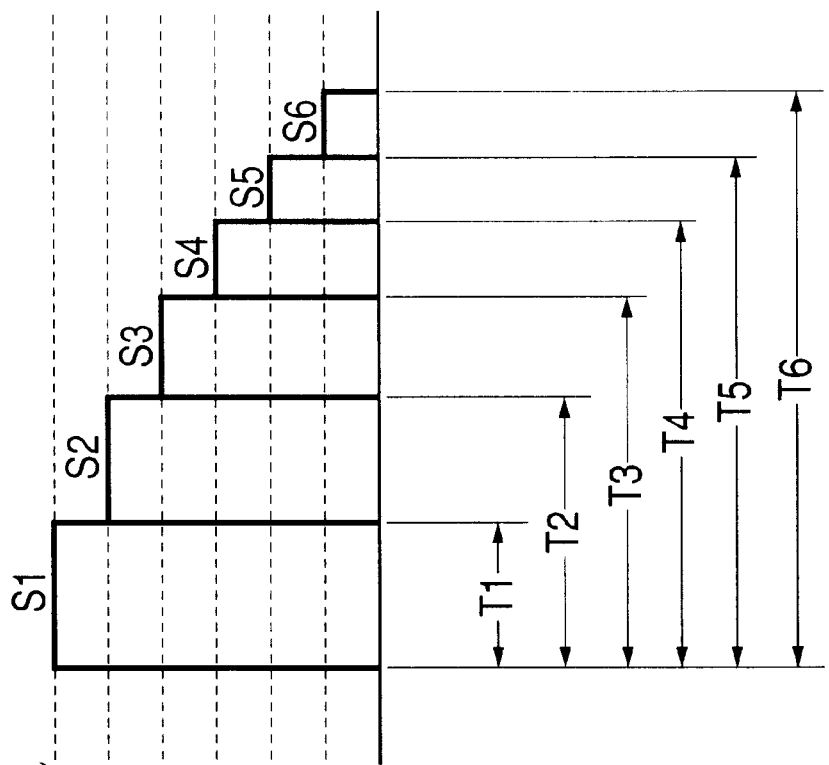
FIGS. 7A and 7B are graphs each for explaining how to obtain an average value.
Figure 7A:
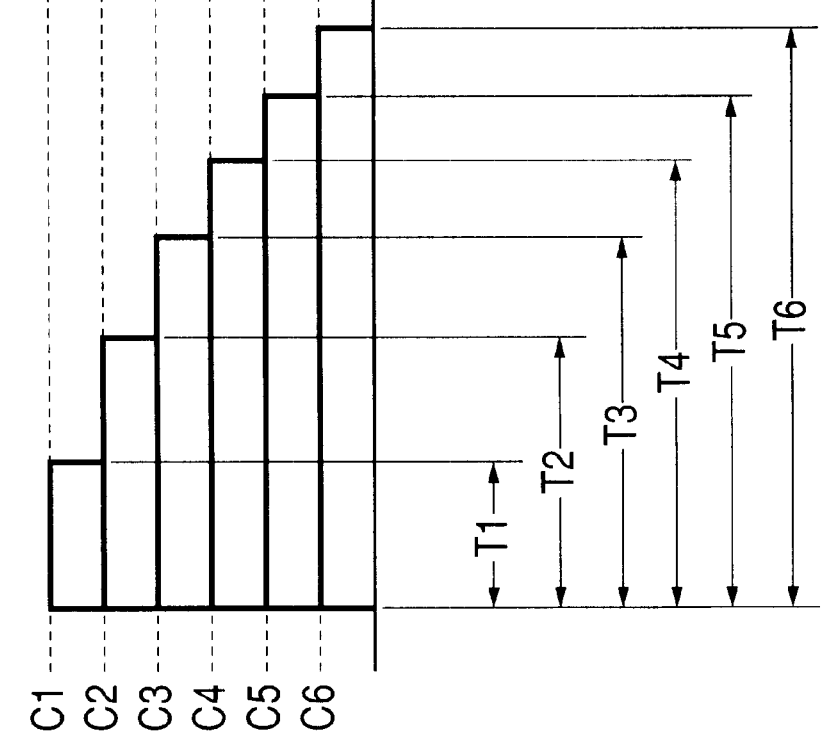

In the above case, the sum of pulse widths is calculated to obtain the area of a pyramidal shape. However, the present invention is not limited to this calculation method. For example, even if the pyramidal shape is changed as shown in FIGS. 7A and 7B, the area remains the same. Various methods can be used to obtain the area depending on how the pyramidal shape is divided. FIG. 7A shows a case where the beginnings of the respective pulses are set to the same timing. FIG. 7B shows a case where the pyramidal shape is divided vertically. The area of the pyramidal shape can be obtained by separately calculating the areas of S1 to S6 and obtaining the sum of the areas. Each of the areas of S2 to S6 can be obtained by obtaining a pulse width difference and multiplying it by the threshold.

Second Embodiment

Figure 2:
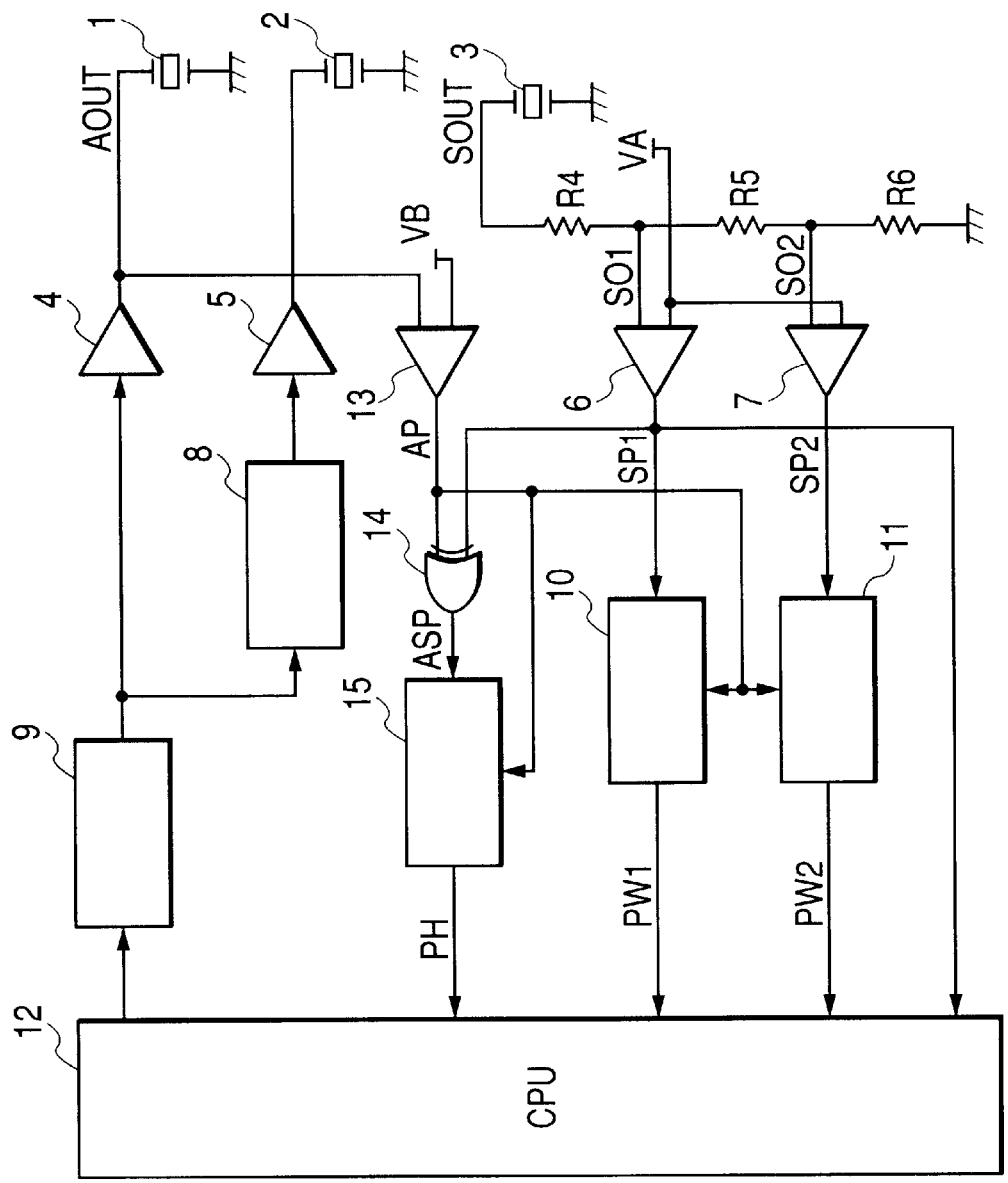
FIG. 2 is a block diagram showing the second embodiment.

FIG. 2 is a block diagram showing the second embodiment of the present invention.

Referring to FIG. 2, a comparator 13 compares a predetermined threshold voltage VB with an AC voltage to be applied to an A-phase PZT 1 serving as the output of an amplifying circuit 4. A known exclusive OR gate (to be referred to as an XOR hereinafter) 14 obtains the exclusive OR of output signals from the comparator 13 and a comparator 6. A phase detecting counter 15 counts the time during which an output signal from the XOR 14 is at high level for a period of time corresponding to an integer multiple of the period of a driving frequency.

It is known that an output pulse from the XOR 14 exhibits a high level for a period of time corresponding to the phase difference between two input signals having the same frequency. This phenomenon is also applied to a phase lock circuit and the like.

In this case, this phenomenon is used to obtain the phase difference between a voltage AOUT applied to the A-phase PZT 1 and a vibration detection signal SOUT.

Figure 4:
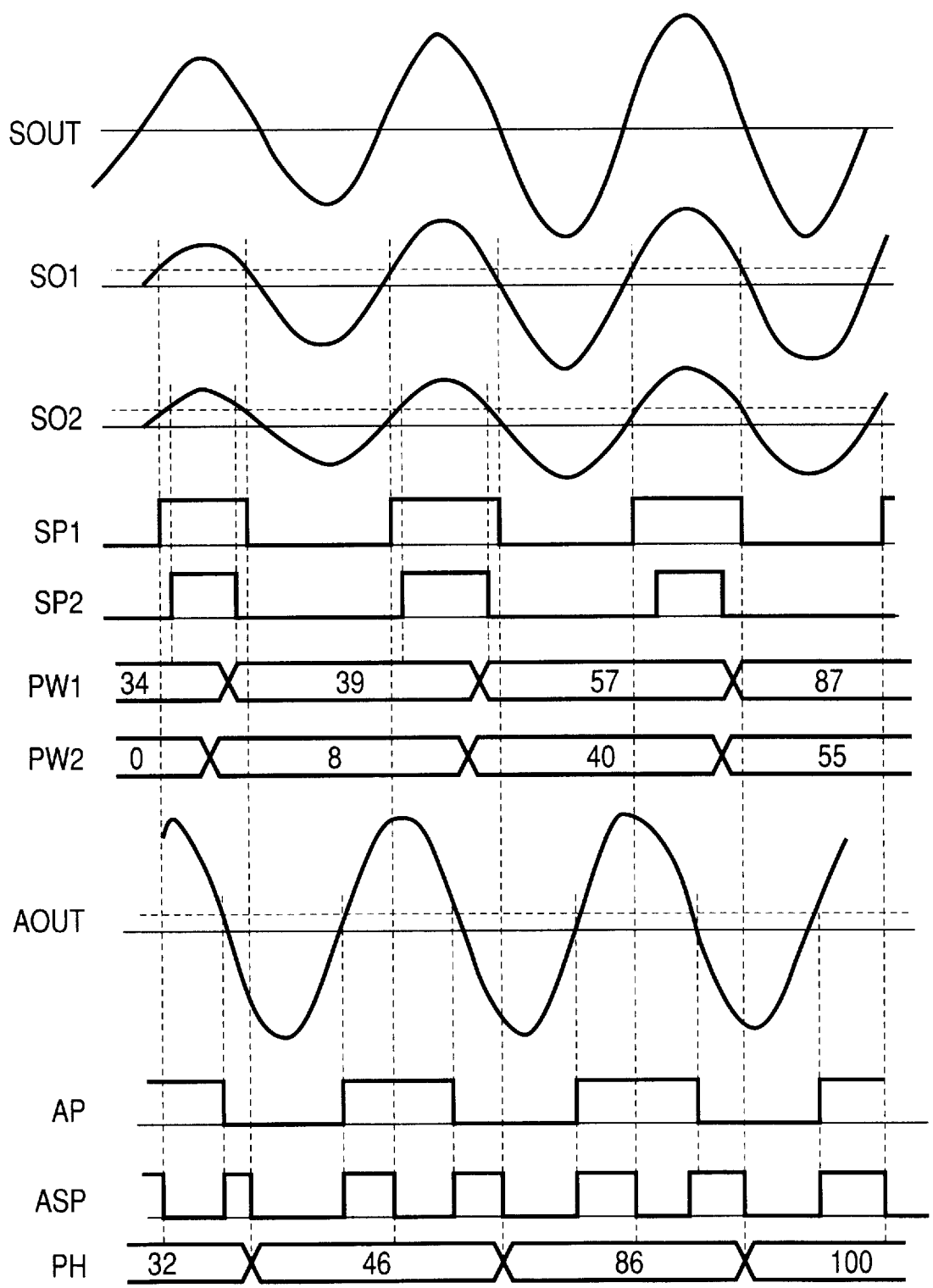
FIG. 4 is a timing chart for explaining the operation of the second embodiment.

The method of detecting the amplitude of SOUT is the same as that in the first embodiment from the viewpoint of detecting pulse widths. However, in contrast to the first embodiment in which two pulse signals are obtained by using two thresholds, in the second embodiment, SOUT is voltage-divided by two voltage division ratios, and the resultant value is compared with one threshold. FIG. 4 shows waveforms at the respective portions.

Of signals SO1 and SO2 obtained by voltage-dividing the signal SOUT, the signal SO2 with a larger voltage division ratio is smaller. As a result of comparison with the same threshold by the comparator 6 and a comparator 7, SP1 has a larger pulse width than SP2.

In addition, since the voltage AOUT applied to the A-phase PZT 1 is sufficiently high, an output AP from the comparator 13 becomes a pulse with a duty of nearly 50%. In this case, AOUT decreases in frequency with time (because sweeping is performed from the high-frequency side to the low-frequency side in driving to decrease the driving frequency toward a target speed). As a consequence, as the driving frequency approaches the resonance frequency of the vibration wave actuator, SOUT representing a vibration amplitude becomes large.

As the amplitude increases, the phase difference between AOUT and SOUT approaches 90°. In practice, an offset value is added to this phase difference depending on how an S-phase PZT is formed.

As shown in FIG. 4, it is obvious from the ASP signal output from the XOR 14 that the pulse width gradually increases. The XOR 14 outputs a pulse signal which has a pulse width of 0 when the phase difference between AP and SP1 is 0° and a frequency twice the frequency of AOUT at a duty of 50% when the phase difference is 90°.

To fix this signal to high level at a phase difference of 180°, it can be detected in the range 0° to 180°. By detecting a phase difference PH between AOUT and SOUT in this manner, it can be checked whether the vibration state of the vibration wave actuator is close to resonance or not. This makes it possible to control the driving frequency to prevent it from decreasing below the resonance frequency.

Figure 14:
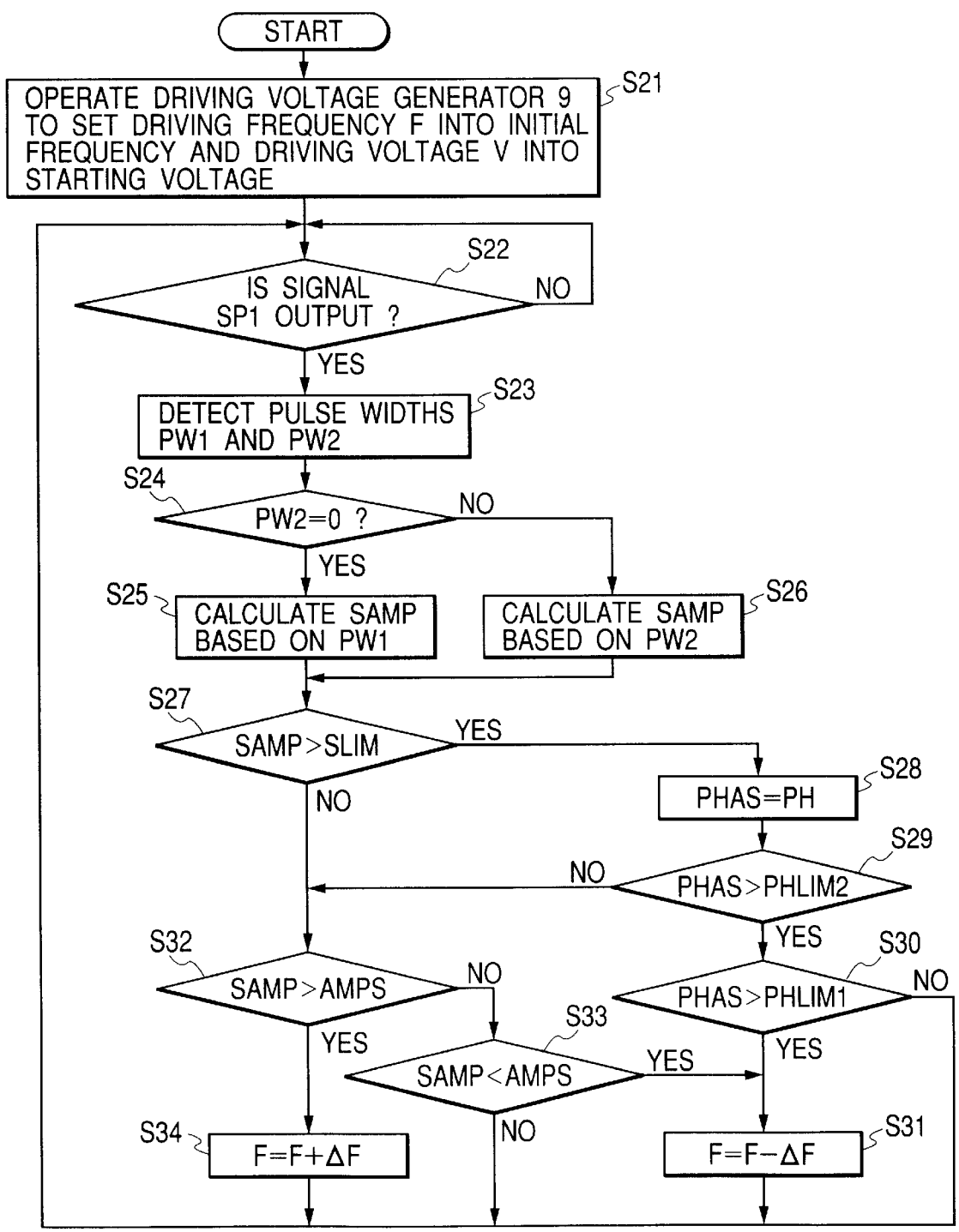
FIG. 14 is a flow chart for explaining the operation of a CPU in the second embodiment.

FIG. 14 is a flow chart showing the operation of the CPU 12.

This embodiment is the same as the first embodiment from the viewpoint of controlling the amplitude of SOUT to a predetermined value, but differs in that control is performed to prevent the phase difference PH from becoming larger than a predetermined phase difference.

First of all, a driving frequency F is set to an initial frequency and a driving voltage V is set to a desired starting voltage in the driving voltage generator 9 (S21). As a consequence, the vibration wave actuator starts rotating, and a small voltage amplitude waveform appears in SOUT. The comparators 6 and 7 then compare SOUT with predetermined thresholds. Pulse widths PW1 and PW2 respectively obtained when the outputs SP1 and SP2 from the comparators 6 and 7 upon comparison with predetermined thresholds are detected by pulse width detecting circuits 10 and 11 are input to a CPU 12.

The CPU 12 detects the pulse widths PW1 and PW2 (S23) at the timing of the signal SP1 from the comparator 6 (S22).

The CPU 12 checks whether the pulse width PW2 is 0 (S24). If the pulse width PW2 is 0, the CPU 12 calculates an amplitude SAMP of SOUT from the pulse width PW1 (S25). The CPU 12 uses a calculation method of obtaining an amplitude from a table determined for the value of the pulse width PW1.

If the pulse width PW2 is not 0, the amplitude of SOUT is calculated from the pulse width PW2 on the basis of the table (S26). In this case, the pulse width to be compared is set to 0. However, this pulse width may take a larger value.

The amplitude SAMP of SOUT is then compared with a predetermined amplitude SLIM (S27). If the amplitude SAMP of SOUT is larger than the predetermined amplitude SLIM, the phase difference PH is detected and substituted into PHAS (S28). If the amplitude SAMP of SOUT is smaller than the predetermined amplitude SLIM, PHAS is set to 0.

If PHAS has reached a predetermined phase difference PHLIM2 (PHLIM2<PHLIM1) (S29) and has also reached a predetermined phase difference PHLIM1 (step S30), the driving frequency F is decreased by ΔF (S31).

Otherwise, the flow returns to step S22. In step S29, PHAS is compared with PHLIM2 smaller than PHLIM1. If PHAS is larger than this value, the loop is terminated without changing the set frequency F.

If PHAS does not exceed PHLIM1 and PHLIM2, the calculated amplitude SAMP of SOUT is compared with a target amplitude AMPS (S32). If the amplitude SAMP of SOUT is smaller than the amplitude AMPS (S33), the driving frequency F is decreased by ΔF (S31). If the amplitude SAMP of SOUT is larger than the amplitude AMPS (S32), the driving frequency F is increased by AF to set a frequency (S34).

In this case, if the amplitude SAMP of SOUT is smaller than the amplitude AMPS, since the driving frequency approaches the resonance frequency of the vibration wave actuator, the vibration amplitude of the vibration wave actuator increases. As a consequence, the amplitude of SOUT increases.

In this manner, the amplitude of SOUT approaches the target amplitude, and the driving frequency is controlled so as not to excessively approach the resonance frequency of the vibration member. Even if the target amplitude AMPS of SOUT is too large, the driving frequency is prevented from becoming lower than the resonance frequency.

In this embodiment, the amplitude of SOUT is obtained by using the table as in the first embodiment. However, another method may be used. This method will be described below.

Figure 17:
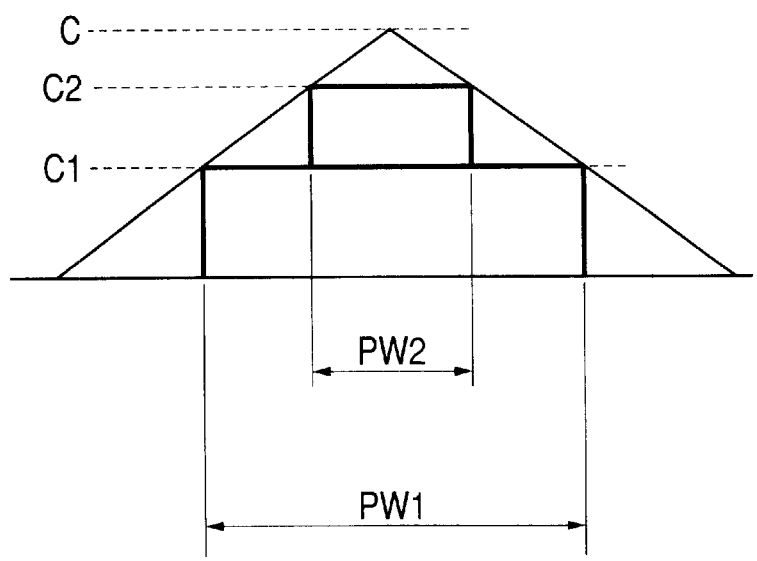
FIG. 17 is a graph for explaining how to calculate a peak value.

Vibration amplitude is obtained by using two pieces of pulse width information PW1 and PW2. FIG. 17 is a view for explaining this operation. In this case, SOUT is voltage-divided into signals SO1 and SO2. These signals are compared with the same threshold to obtain the outputs SP1 and SP2 from the comparators 6 and 7. Obviously, as in the first embodiment, the same pulse signals SP1 and SP2 can also be obtained by comparing SOUT with two different thresholds.

Assume that SP1 and SP2 are obtained by using two thresholds C1 and C2. In this case, if SOUT is approximated to a triangular wave, the relationship between the triangular wave, the pulse waveform, and the thresholds like that shown in FIG. 17 can be obtained. More specifically, if the comparator compares the threshold C1 with the triangular wave, the pulse signal SP1 having the pulse width PW1 is output. If the comparator compares the threshold C2 with the triangular wave, the pulse signal SP2 having the pulse width PW2 is output. Obviously, letting C be the height of the vertex, the height can be expressed by $$C = \frac{PW2}{PW1 - PW2}(C2 - C1) + C2 \quad (3)$$

By calculating C given by equation (3), therefore, the amplitude of SOUT can be approximately known. To substitute the equation based on resistance division in this embodiment for equation (3), C1 and C2 may be expressed by:

$$C1 = \frac{R4 + R5 + R6}{R5 + R6} \times VA \quad (4)$$

$$C2 = \frac{R4 + R5 + R6}{R6} \times VA \quad (5)$$

In this case, since a triangular wave is assumed, an average value can be approximately obtained by dividing (1/2) C expressed by equation (3) by the period defined by the driving frequency. An effective value can be obtained by dividing $(1/\sqrt{3})C$ by the period defined by the driving frequency.

Third Embodiment

Figure 8:
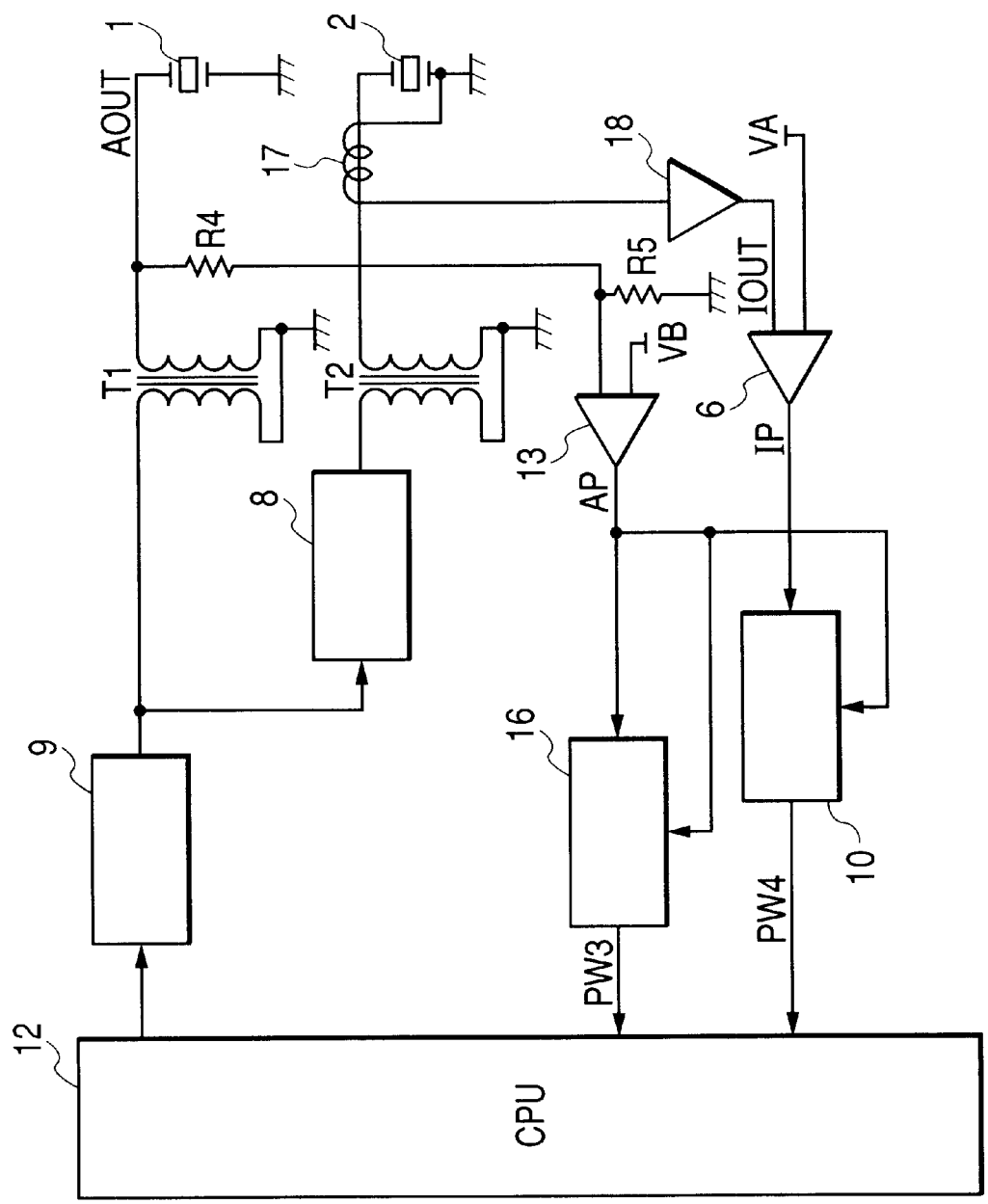
FIG. 8 is a block diagram showing the third embodiment.

FIG. 8 is a block diagram showing the third embodiment of the present invention.

Referring to FIG. 8, a pulse width detecting means 16 is desired to detect the amplitude of a voltage AOUT applied to an A-phase PZT. The pulse width detecting means 16 detects the pulse width of a pulse signal output from a comparator 13. A CPU 12 calculates the amplitude of AOUT.

One input to the comparator 13 is a predetermined threshold voltage VB; and the other, a signal obtained by resistance-dividing the signal AOUT by R4 and R5. A current transformer 17 detects a current flowing into a B-phase PZT. An amplifier 18 amplifies an output from the current transformer 17.

An output IOUT from the amplifier 18 is compared with a threshold voltage VA by a comparator 6 to obtain a pulse signal IP. A pulse width detecting means 10 detects the pulse width of the pulse signal IP. The CPU 12 calculates current amplitude.

Note that this embodiment is configured to detect a vibration state without using any vibration detection electrode of a piezoelectric element unlike the embodiment described above.

Figure 15:
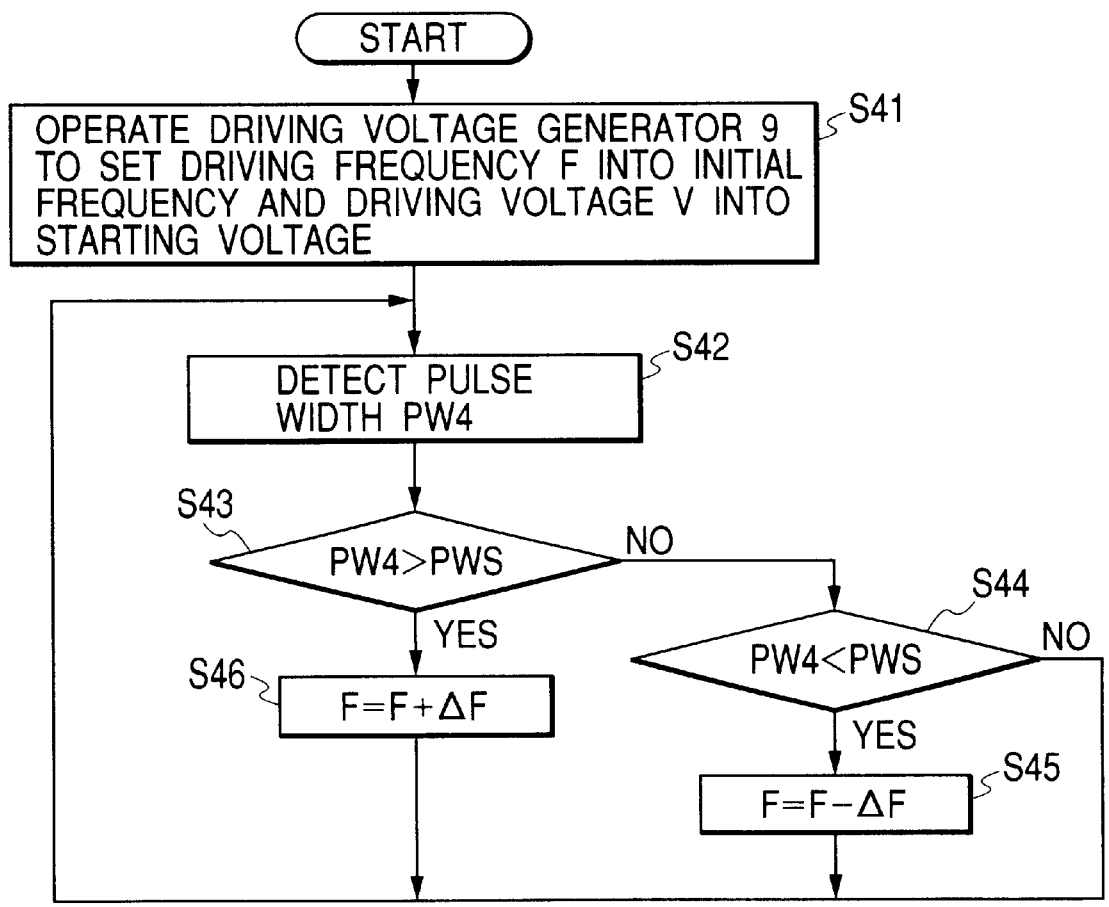
FIG. 15 is a flow chart for explaining the operation of a CPU in the third embodiment.
Figure 16:
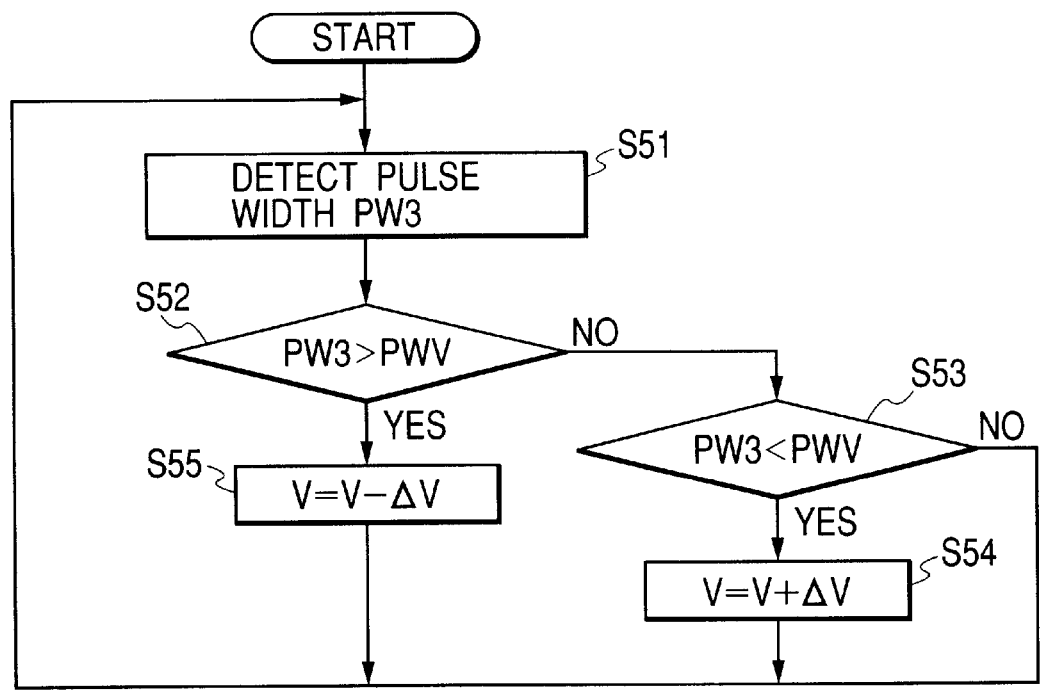
FIG. 16 is a flow chart for explaining the operation of a CPU in the third embodiment.

FIGS. 15 and 16 are flow charts showing the operation of the CPU 12. The operation of the CPU 12 will be described with reference to these flow charts.

First of all, a driving frequency F is set to an initial frequency and a driving voltage V is set to a desired starting voltage in a driving voltage generator 9 (S41). As a consequence, the vibration wave actuator starts rotating, and a small voltage amplitude waveform appears in the output IOUT from the amplifier 18.

The comparator 6 then compares IOUT with a predetermined threshold. A pulse width PW4 detected by the pulse width detecting circuit 10 is input to the CPU 12.

In this case, the CPU 12 detects PW4 (S42) and compares it with a target pulse width PWS corresponding to a predetermined target value of IOUT (S43). If PW4 is smaller (S44), the driving frequency F is decreased by ΔF (S45). If PW4 is larger, the driving frequency F is increased by ΔF (S46).

If PW4 is smaller, since the driving frequency F approaches the resonance frequency of the vibration wave actuator, the current flowing into the vibration wave actuator increases, resulting in an increase in the amplitude of IOUT. In this manner, the amplitude of IOUT approaches the target amplitude.

The CPU 12 performs another control concurrently with the above control. The pulse width detecting means 16 outputs a pulse width corresponding to the amplitude of AOUT. In the first and second embodiments, voltages are applied to the A-phase PZT 1 and B-phase PZT 2 through the amplifying circuits 4 and 5. In this embodiment, however, voltages are boosted by transformers T1 and T2 and applied to the above piezoelectric elements.

If, therefore, the driving frequency changes depending on the relationship in impedance between the transformers and the A-phase PZT 1 and B-phase PZT 2, the amplitude of the applied voltage changes. In order to eliminate such an amplitude change, the CPU 12 calculates the amplitude of the signal AOUT from a pulse width PW3 detected by the pulse width detecting means 16, and sends a driving voltage command to the driving voltage generator 9. FIG. 16 is a flow chart showing this operation.

Referring to the flow chart of FIG. 16, first of all, it is checked whether the actuator is in a driven state. Then, PW3 is read into the CPU 12 (S51) and is compared with a pulse width PWV corresponding to the target voltage amplitude (S52). If PW3 is larger than the target pulse width, a driving voltage V is decreased by AV (S55).

If PW3 is smaller than the target pulse width (S52, S53), the driving voltage V is increased by AV (S55).

This operation is repeated until the actuator is stopped.

By controlling the current flowing into each piezoelectric element of the vibration member while keeping a driving voltage to a predetermined value in this manner, the phenomenon in which an applied voltage rises due to the influences the transformer at the time of low-speed driving operation can be properly handled. This makes it possible to efficiently drive the vibration wave actuator.

Fourth Embodiment

Figure 11:
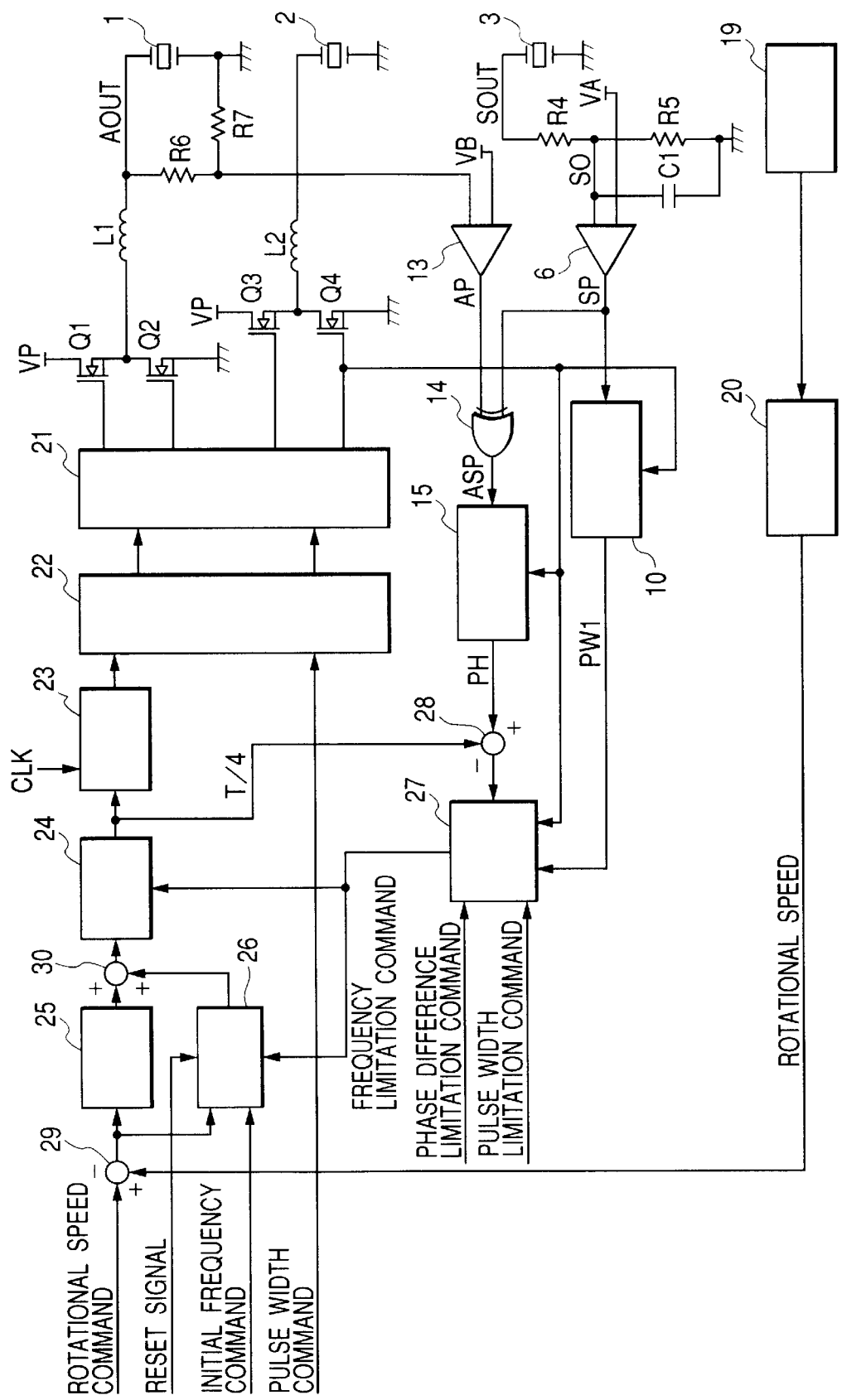
FIG. 11 is a block diagram showing the fourth embodiment.

FIG. 11 is a block diagram showing the fourth embodiment of the present invention.

Referring to FIG. 11, a rotary encoder 19 detects the rotational position of a vibration wave actuator. A period counter 20 detects the frequency of a pulse signal output from the rotary encoder 19.

A driver 21 drives MOSFETs Q1 to Q4. A pulse generating circuit 22 outputs two-phase pulse signals having a phase difference of 90° and a pulse width determined by a pulse width command from a command circuit (not shown) from a frequency four times higher than the driving frequency of the vibration wave actuator. A frequency divider 23 generates a pulse signal having a frequency four times higher than the driving frequency of the vibration wave actuator by counting CLK signals (normally having a frequency of 10 MHz or higher) from a high-frequency oscillator such as a quartz oscillator (not shown). In this embodiment, a programmable frequency divider (a frequency divider is formed by using a device that can be formed into an arbitrary circuit in accordance with a program) is used.

A frequency limiting circuit 24 limits the driving frequency so as not to exceed a predetermined range. A subtracter 29 subtracts the period detected by the period counter 20 from a rotational speed command from a command circuit (not shown). A proportional element 25 amplifies an output from the subtracter 29 with a predetermined gain. An integrating element 26 integrates an output from the subtracter 29 at a predetermined timing. An adder 30 adds outputs from the proportional element 25 and integrating element 26.

A subtracter 28 calculates the difference between the period (T/4) of a frequency four times higher than the driving frequency and PH signal which is the phase difference between a signal AOUT and a signal SOUT. The T/4 signal has a value corresponding to a time equivalent to 90° in the driving frequency. An output from the subtracter 28 therefore indicates the time difference between the time corresponding to the phase difference between AOUT and SOUT and the time corresponding to 90° in the driving frequency.

This is one of the methods of solving the problem that when a phase difference is detected on the basis of times, even if the same time values are detected, the converted phase difference differs as the driving frequency changes. This method can at least determine whether a phase difference is larger or smaller than 90°. In practice, a phase difference limitation command takes a value near 90°. By obtaining the difference between a value to be compared and a time corresponding to a value near 90°, therefore, the precision of detection of a phase difference is improved.

In addition, since the period defined by the driving frequency is known, a time corresponding to a phase difference limitation command (to be described later) may be directly calculated from this period, and the calculated time may be subtracted by the subtracter 28.

A phase difference comparing circuit 27 compares an output from the subtracter 28 with a phase difference limitation command from a command circuit (not shown). If a pulse width signal PW1 corresponding to the amplitude of SOUT is larger than the pulse width limitation command from the command circuit (not shown), the phase difference comparing circuit 27 detects an output from the subtracter 28 and compares it with the above phase difference limitation command. If the output value from the subtracter 28 is larger than the phase difference limitation command, the phase difference comparing circuit 27 outputs a frequency limitation command. As a consequence, the integrating element 26 stops integration in accordance with the command, and decreases the integral value by ΔT. The frequency limiting circuit 24 interrupts an input from the adder 30 and decreases the current output by ΔT.

The overall operation will be described below.

This embodiment aims at controlling the rotational speed of the vibration wave actuator in accordance with a rotational speed command from a command circuit (not shown). The rotational speed command serves to set a value corresponding to the period of a pulse signal from the rotary encoder 19 to detect the rotation of the vibration wave actuator.

The subtracter 29 compares the above rotational speed command with a period corresponding to the frequency of an output pulse from the rotary encoder 19 which is detected by the period counter 20. If this comparison result takes a positive value, since the actual rotational speed signal represents a period, the periods are compared with each other. This positive value therefore indicates that the rotational speed signal (period) of the vibration wave actuator is larger than the rotational speed command (period). This indicates that the actual rotational speed is lower than the target rotational speed.

In this case, a driving frequency is set by setting a frequency division count for the programmable frequency divider 23. If an output from the subtracter 29 is a positive value, the frequency division count increases. As a consequence, the period of the output signal increases, and the driving frequency decreases. The driving frequency then approaches the resonance frequency of the vibration wave actuator, and the rotational speed increases and approaches the target rotational speed.

If an output from the subtracter 29 is a negative value, and the actual rotational speed is higher than the rotational speed command, the driving frequency increases, and the rotational speed decreases and approaches the target rotational speed.

A driving voltage generating unit including components after the output of the programmable frequency divider 23 will be described next.

The pulse generating circuit 22 generates two-phase pulses having a phase difference of 90° on the basis of a pulse signal having a frequency four times higher than the driving frequency output from the frequency divider 23. The frequency four times higher than the driving frequency has ¼ the period of the driving frequency, and hence is convenient in setting a phase difference of 90°. In addition, a pulse width is set in accordance with a pulse width command from a command circuit (not shown). The two-phase pulse signals drive two half bridges constituted by the MOSFETs Q1 and Q2 and the MOSFETs Q3 and Q4 to convert an output pulse from the pulse generating circuit 22 into a pulse signal having an amplitude VP.

The driver 21 generates four-phase signals for driving the MOSFETs Q1 to Q4 from the two-phase pulse signals from the pulse generating circuit 22, and is comprised of a delay circuit for preventing the MOSFETs Q1 and Q2 and MOSFETs Q3 and Q4 from being turned on at the same time, a voltage converting circuit for driving the MOSFETs Q1 and Q3, and the like.

The half bridges constituted by the MOSFETs Q1 and Q2 and MOSFETs Q3 and Q4 apply AC voltages to the A-phase PZT 1 and B-phase PZT 2 through inductor elements L1 and L2.

In this case, the inductor elements L1 and L2 are used to raise a voltage and reduce an inrush current. A voltage AOUT applied to the A-phase PZT 1 may become higher than a power supply voltage VP of each half bridge.

Rotational speed control operation will be described in more detail next.

The comparison result obtained by the subtracter 29 is input to the proportional element 25 and integrating element 26 to perform control based on proportional integrating operation. The adder 30 adds outputs from the proportional element 25 and integrating element 26. The rotational speed of the vibration wave actuator is then controlled by proportional integrating operation in accordance with an output from the adder 30.

With regard to the relationship between the driving frequency and the proportional integration result obtained by the proportional element 25, integrating element 26, and adder 30, this result directly represents a period corresponding to a frequency four times higher than the driving frequency. At the time of startup, a reset signal is input from a command circuit (not shown) to the integrating element 26. As a consequence, the integrating element 26 sets an initial frequency command corresponding to a period corresponding to a frequency four times higher than the initial frequency from the command circuit (not shown). In the initial state, a rotational speed command from the command circuit (not shown) is the maximum period indicating a stopped state. In addition, an output from the period counter 20 is saturated, and the rotational speed has a maximum period. An output from the subtracter 29 is 0.

At the frequency at the time of startup, since output of the proportional element 25 is 0, the adder 30 outputs a period corresponding to the initial frequency command from the command circuit (not shown) which is set in the integrating element 26. In this case, if the pulse width command from the command circuit (not shown) is set to a predetermined pulse width, a pulse signal having a frequency equal to the frequency of the initial frequency command from the command circuit (not shown) and the predetermined pulse width is output from each MOSFET to the vibration wave actuator, and driving voltages having an amplitude corresponding to this pulse signal are applied to the A-phase PZT 1 and B-phase PZT 2. When the reset signal from the command circuit (not shown) is released, and the rotational speed command from the command circuit (not shown) rises, the subtracter 29 outputs a positive value, and the proportional element 25 outputs a positive value. In addition, the output from the integrating element 26 increases. As a consequence, the frequency of the driving voltages applied to the A-phase PZT 1 and B-phase PZT 2 decreases, and the vibration wave actuator starts accelerating. In this manner, the rotational speed of the vibration wave actuator is controlled to follow up the rotational speed command from the command circuit (not shown).

A processing circuit for the output signal SOUT from the S-phase PZT 3, which is a detection signal based on the vibration amplitude of the vibration wave actuator will be described next.

The S-phase PZT 3 generally has a small capacitance, and hence may be affected by noise. For this reason, resistance voltage division of SOUT is performed by using resistors R4 and R5, and a capacitor C1 is connected in parallel with the resistor R5 to form a low-pass filter. Therefore, noise superimposed on SOUT is attenuated in a signal SO.

A comparator 6 compares the signal SO with a threshold voltage VA to convert the signal SO into a pulse signal SP. A pulse width detecting means 10 then detects a pulse width signal PW1 of the pulse signal SP. A voltage AOUT applied to the A-phase PZT 1 is voltage-divided by resistors R6 and R7. A comparator 13 then compares the resultant voltage with a threshold voltage VB and converts it into a pulse signal AP.

An XOR 14 calculates the exclusive OR of the pulse signal SP and the pulse signal AP to obtain a pulse signal ASP for phase detection. A phase detecting counter 15 detects a phase difference PH. As described above, the subtracter 28 then subtracts a time (T/4) corresponding to 90° of the driving frequency from the phase difference PH. The subtraction result is input as phase information to the phase difference comparing circuit 27.

The manner in which the phase difference comparing circuit 27 contributes to rotational speed control will be described below.

A phase difference signal cannot be used as phase information unless the signals SP and AP have a pulse width near a duty of 50%. For this reason, the phase difference comparing circuit 27 performs no frequency limiting operation until the pulse width signal PW1 exceeds a pulse width limitation command from the command circuit (not shown). Therefore, frequency limiting operation is performed when the amplitude of the signal SOUT increases to a certain degree, i.e., the rotational speed increases to a certain degree.

When the phase difference between the signals AP and SP exceeds a predetermined value, driving frequency control is stopped for the following reason. If the frequency of an AC voltage applied to the vibration wave actuator decreases below the resonance frequency of the vibration wave actuator, the rotation is stopped. If the rotational speed becomes slow due to a load variation or the like, control is performed to decrease the driving frequency. If a phase difference set when the driving frequency is higher than the resonance frequency is set as a phase difference for control in advance, the driving frequency can be prevented from becoming lower than the resonance frequency by increasing the frequency by ΔF when the detected phase difference exceeds the phase difference for control.

That is, a phase difference limitation command from the command circuit (not shown) is compared with an output from the subtracter 28. If the output exceeds the phase difference limitation command, a frequency limitation command is output to make the integrating element 26 stop integration and decrease the integral value by ΔT. In addition, the frequency limiting circuit 24 stops receiving an output from the adder 30, and the previous output value is decreased by ΔT. As a consequence, the frequency division ratio of the programmable frequency divider 23 decreases, and the driving frequency increases. This makes it possible to prevent the driving frequency from becoming lower than the resonance frequency.

In this manner, the rotational speed of the vibration wave actuator is controlled without letting the driving frequency become lower than the resonance frequency.

In this embodiment, an AC voltage is converted into a pulse waveform by using a comparator. Obviously, however, this voltage can also be converted into a pulse width in the same manner by using a logic element for determining high level or low level with a predetermined voltage, such as a CMOS logic IC or 74HC541. In this case, a rotational speed is detected from an output from the rotary encoder 19 and controlled. However, the rotary encoder 19 can also detect a position, and an acceleration or force can be obtained from information about a change in position or rotational speed within a predetermined period of time. Obviously, therefore, such values can be controlled by using a vibration amplitude, inflow current, and applied voltage upon converting them into pulse widths.

What is claimed is:

1. A vibration wave actuator apparatus which excites a vibration member and obtains a driving force by applying a frequency signal to a driving electro-mechanical energy conversion element mounted on the vibration member, comprising:

a driven state detecting unit which detects a vibration state of the vibration member, said driven state detecting unit including a monitor unit which outputs a waveform signal having an amplitude corresponding to the vibration state of the vibration member, a pulse width forming circuit which forms a pulse width signal by comparing a signal from said monitor unit with a threshold, and a determining circuit which determines the driven state in accordance with the pulse width.

2. An apparatus according to claim 1, wherein said comparing circuit comprises a plurality of circuits having different thresholds, and said pulse width forming circuit forms a pulse width signal having a value corresponding to a comparison result from each of said comparing circuits.

3. An apparatus according to claim 2, wherein said determining circuit selects a predetermined pulse width signal of the pulse width signals, and determines a vibration state in accordance with the selected signal.

4. An apparatus according to claim 3, wherein said determining circuit selects a pulse width signal of the pulse width signals which has a minimum value other than 0.

5. An apparatus according to claim 1, wherein said apparatus further comprises a converting circuit which converts a signal from said monitor unit into a plurality of signals having different values, said pulse width forming circuit includes a comparing circuit comparing the respective converted signals, and said pulse width forming circuit forms a pulse width signal having a value corresponding to each comparison result from said comparing circuit.

6. An apparatus according to claim 5, wherein said determining circuit selects a predetermined pulse width signal of the pulse width signals, and determines a vibration state in accordance with the selected signal.

7. An apparatus according to claim 6, wherein said determining circuit selects a pulse width signal of the pulse width signals which has a minimum value other than 0.

8. A control apparatus for a vibration wave actuator including a driving unit which forms driving vibrations in a vibration member by applying a frequency signal to an electro-mechanical energy conversion element mounted on the vibration member, and a driven state detecting unit which detects a driven state of the vibration member, wherein said driven state detecting unit comprises a state detecting unit which detects a driven state of the vibration member and outputs a waveform signal having an amplitude corresponding to the driven state, a comparing circuit which compares an output waveform signal from said state detecting unit with one or a plurality of thresholds and outputs a pulse signal, a pulse width detecting circuit which detects a pulse width or pulse widths of one or a plurality of pulse signals output from said comparing circuit, and a determining circuit which determines the driven state in accordance with one or a plurality of pulse widths detected by said pulse width detecting circuit.

9. A control apparatus for a vibration wave actuator including a driving unit which forms driving vibrations in a vibration member by applying a frequency signal to an electro-mechanical energy conversion element mounted on the vibration member, and a driven state detecting unit which detects a driven state of the vibration member, wherein said driven state detecting unit comprises a state detecting unit which detects a driven state of the vibration member and outputs a waveform signal having an amplitude corresponding to the driven state, a multiplying circuit which multiplies the output waveform signal from said state detecting unit by one or a plurality of coefficients, a comparing circuit which compares one or a plurality of multiplication signals obtained by said multiplying circuit with one or a plurality of thresholds and outputs a pulse signal, a pulse width detecting circuit which detects one or a plurality of pulse signals output from said comparing circuit, and a determining circuit which determines the driven state in accordance with one or a plurality of pulse widths detected by said pulse width detecting circuit.

10. An apparatus according to claim 8, wherein said determining circuit determines a vibration amplitude of the waveform signal in accordance with the pulse width.

11. A control apparatus for a vibration wave actuator including a driving unit which forms driving vibrations in a vibration member by applying a frequency signal to an electro-mechanical energy conversion element mounted on the vibration member, and a driven state detecting unit which detects a voltage applied to the electro-mechanical energy conversion element of the vibration member, wherein said driven state detecting unit comprises a comparing circuit which compares the applied voltage with one or a plurality of thresholds and outputs a pulse signal, a pulse width detecting circuit which detects a pulse width one or a plurality of pulse signals output from said comparing circuit, and a control circuit which increases/decreases the applied voltage in accordance with one or a plurality of pulse widths detected by said pulse width detecting circuit.

12. A control apparatus for a vibration wave actuator including a driving unit which forms driving vibrations in a vibration member by applying a frequency signal to an electro-mechanical energy conversion element mounted on the vibration member, and a driven state detecting unit which detects a voltage applied to the electro-mechanical energy conversion element of the vibration member, wherein said driven state detecting unit comprises a multiplying circuit which multiplies the applied voltage by one or a plurality of coefficients, a comparing circuit which compares one or a plurality of multiplication signal obtained by said multiplying means with one or a plurality of thresholds, and outputs a pulse signal, a pulse width detecting circuit which detects a pulse width of one or a plurality of pulse signals output from said comparing circuit, and a control circuit which increases/decreases the applied voltage in accordance with one or a plurality of pulse widths detected by said pulse width detecting circuit.

13. A control apparatus for a vibration wave actuator including a driving unit which forms driving vibrations in a vibration member by applying a frequency signal to an electro-mechanical energy conversion element mounted on the vibration member, and a driven state detecting unit which detects a voltage applied to the electro-mechanical energy conversion element of the vibration member, wherein said driven state detecting unit comprises a state detecting circuit which detects a vibration amplitude of the vibration member or an inflow current to the electro-mechanical energy conversion element and outputs a detection result as a waveform signal, a first comparing circuit which compares the output waveform signal from said state detecting circuit with one or a plurality of thresholds and outputs a first pulse signal, a first pulse width detecting circuit which detects a pulse width of the first pulse signal, a second comparing circuit for comparing the applied voltage with one or a plurality of thresholds and outputs a second pulse signal, a second pulse width detecting circuit which detects a pulse width of the second pulse signal, a phase difference detecting circuit which detects a phase difference between the first pulse signal and the second pulse signal, and a control circuit which, when an output from said first pulse width detecting circuit is larger than a predetermined value, controls the frequency signal in accordance with a phase difference detecting result from said phase difference detecting circuit.

* * * * *

UNITED STATES PATENT AND TRADEMARK OFFICE
CERTIFICATE OF CORRECTION

PATENT NO. : 6,635,977 B2
APPLICATION NO. : 10/022520
DATED : October 21, 2003
INVENTOR(S) : Kenichi Kataoka et al.

It is certified that error appears in the above-identified patent and that said Letters Patent is hereby corrected as shown below:

COLUMN 10:
Line 3, "AV" should read --$\Delta V$--.
Line 5, "AV" should read --$\Delta V$--.

COLUMN 16:
Line 14, "signal" should read --signals--.

Signed and Sealed this

Nineteenth Day of February, 2008

JON W. DUDAS
*Director of the United States Patent and Trademark Office*